US007624154B2

(12) United States Patent
Wang

(10) Patent No.: US 7,624,154 B2
(45) Date of Patent: *Nov. 24, 2009

(54) APPARATUS AND METHOD FOR HANDLING ELECTRONIC MAIL

(75) Inventor: Bing Wang, San Jose, CA (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,238

(22) Filed: Oct. 22, 2007

(65) Prior Publication Data

US 2008/0040439 A1 Feb. 14, 2008

Related U.S. Application Data

(63) Continuation of application No. 09/895,532, filed on Jun. 29, 2001, now Pat. No. 7,328,250.

(51) Int. Cl.
G06F 15/16 (2006.01)
(52) U.S. Cl. ........................ 709/206; 709/203; 709/207; 709/218; 709/223; 709/224; 709/225; 709/227; 709/229; 707/10
(58) Field of Classification Search ................ 709/207, 709/218, 220–229
See application file for complete search history.

(56) References Cited

U.S. PATENT DOCUMENTS

| 5,315,586 A | 5/1994 | Charvillat |
| 5,369,570 A | 11/1994 | Parad |
| 5,619,648 A | 4/1997 | Canale et al. |
| 5,930,479 A | 7/1999 | Hall |
| 5,999,967 A | 12/1999 | Sundsted |
| 6,052,709 A | 4/2000 | Paul |
| 6,092,101 A | 7/2000 | Birrell et al. |
| 6,112,227 A | 8/2000 | Heiner |
| 6,137,777 A | 10/2000 | Vaid et al. |

(Continued)

FOREIGN PATENT DOCUMENTS

EP 0974917 1/2000

(Continued)

OTHER PUBLICATIONS

Sep. 15, 2008 European Patent Office, Supplementary European Search Report, Application No. EP 02 74 1005, Apr. 25, 2007, 2 pages.

*Primary Examiner*—Jude J Jean Gilles
(74) *Attorney, Agent, or Firm*—Ditthavong Mori & Steiner, P.C.

(57) ABSTRACT

A mail transfer agent adapted for determining the disposition of incoming e-mail from a sender includes a penalty count filter module (20 which functions on the basis of current communication system resource usage, such as the number of concurrent TCP connections being maintained, and penalty counts assigned for cumulative undesirable sender activity such as sending large e-mail files. The penalty count filter module can operate in a selective-rejection state accepting e-mail from senders without a penalty count and randomly accepting other e-mail, and in a random-rejection state rejecting all e-mail from senders with a penalty count and randomly rejecting other e-mail. The rejection rates can be increased or decreased in response to a detected increase or decrease in the usage of system resources.

28 Claims, 10 Drawing Sheets

U.S. PATENT DOCUMENTS

| | | |
|---|---|---|
| 6,161,130 A | 12/2000 | Horvitz et al. |
| 6,321,267 B1 * | 11/2001 | Donaldson .................. 709/229 |
| 6,393,464 B1 | 5/2002 | Dieterman |
| 6,484,197 B1 | 11/2002 | Donohue |
| 6,484,203 B1 | 11/2002 | Porras et al. |
| 6,502,135 B1 * | 12/2002 | Munger et al. .............. 709/225 |
| 6,507,866 B1 * | 1/2003 | Barchi ........................ 709/207 |
| 7,092,992 B1 | 8/2006 | Yu |
| 2008/0256072 A1 * | 10/2008 | Logan et al. ................... 707/7 |

FOREIGN PATENT DOCUMENTS

| | | |
|---|---|---|
| WO | 9959071 | 11/1999 |
| WO | 0060819 | 10/2000 |
| WO | 0138999 | 5/2001 |

* cited by examiner

US 7,624,154 B2

APPARATUS AND METHOD FOR HANDLING ELECTRONIC MAIL

CROSS REFERENCE TO RELATED APPLICATIONS

This application is a continuation of Ser. No. 09/895,532, filed Jun. 29, 2001, entitled "Apparatus and Method for Handling Electronic Mail," herein incorporated by reference.

FIELD OF THE INVENTION

This invention relates to network communication systems and, in particular, to a system and method for handling incoming electronic mail messages.

BACKGROUND OF THE INVENTION

Denial of service attacks, including mail flooding, are common problems affecting the security of a mail transfer agent used in the management of electronic mail (e-mail). In the present state of the art, one possible response is to reject all incoming e-mail during a mail flooding or denial of service attack incident. However, such a response may be undesirable as e-mail from a legitimate sender can be rejected along with the mail flood from a problem sender. The present state of the art does not provide a method of distinguishing between the problem sender and the legitimate sender during periods of high e-mail activity.

What is needed is a method for responding to incoming e-mail which selectively rejects e-mail from a problem sender and selectively accepts e-mail from a legitimate sender during the onset of mail flooding or denial of service attack.

SUMMARY OF THE INVENTION

The present invention results from the observation that e-mail senders initiating undesirable activities can be identified and tracked by utilizing a penalty count filter module, integrated into the front end of a mail transfer agent in a communication device, so that subsequent e-mail disruptions to the receiving device can be mitigated. The penalty count filter module determines the disposition of incoming e-mail on the basis of current communication system resource usage and penalty counts assigned for cumulative undesirable sender activity. System resource usage may be determined by the number of concurrent TCP connections being maintained, and the undesirable sender activity, which is tracked using a behavior trace table, may include sending a large number of e-mails or using a relatively large amount of TCP connection time. The penalty count filter module operates in a plurality of states, including a normal state, a selective-rejection state, and a random-rejection state. In the selective rejection state, e-mail from senders having a penalty count are randomly rejected, and e-mail from senders without a penalty count are accepted. In the random-rejection state, all e-mail from senders having a penalty count is rejected, and e-mail from senders without a penalty count are randomly rejected. The rejection rates can be increased or decreased in response to a detected increase or decrease in the usage of system resources.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
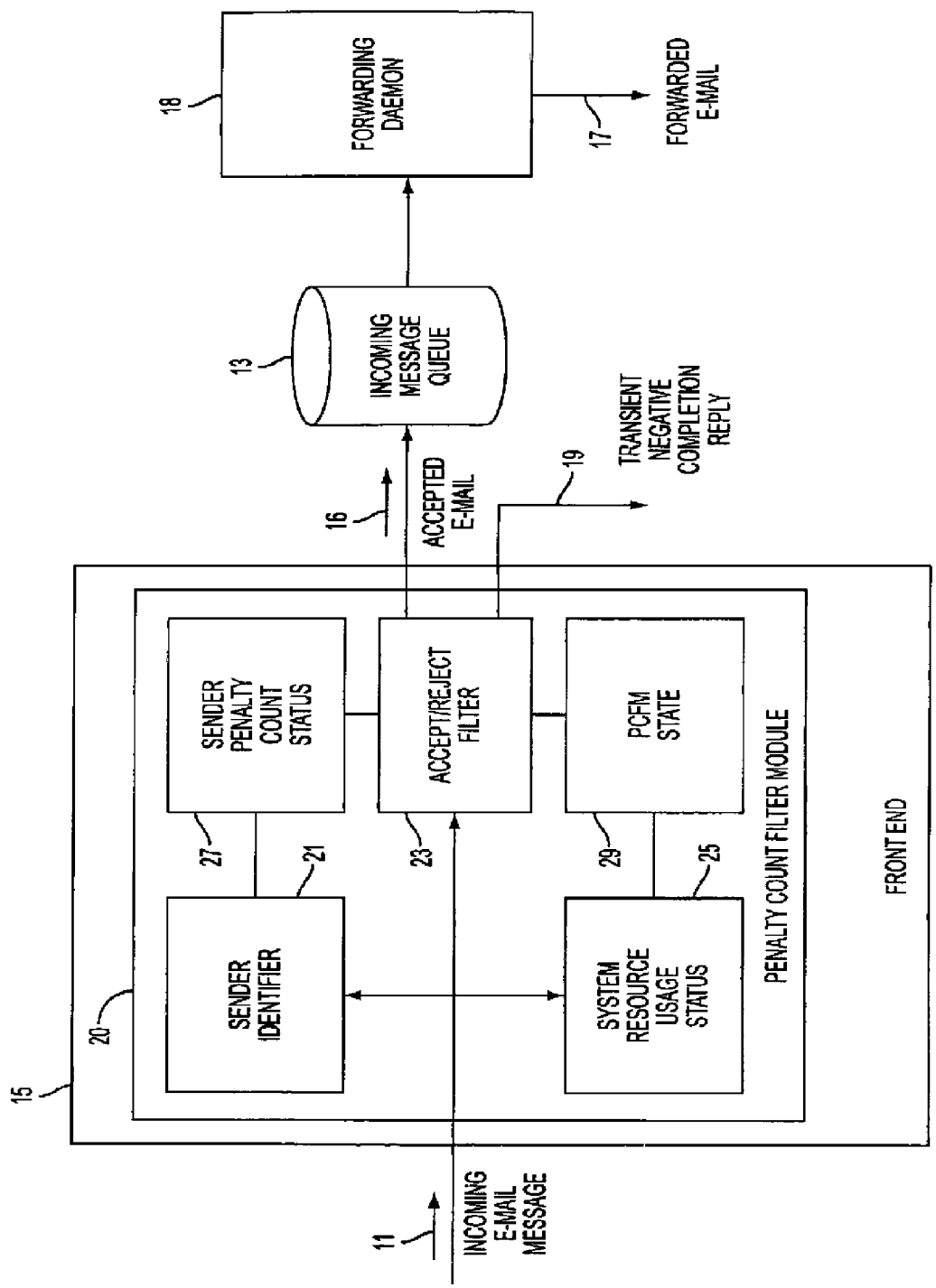
FIG. 1 is a diagrammatical representation of a mail transfer agent including a penalty count filter module for determining the disposition of incoming electronic mail.

There is shown in FIG. 1 a functional block diagram of a mail transfer agent 10, adapted for receiving an incoming e-mail message 11 via a communications network (not shown) such as the Internet. The mail transfer agent 10 can be integrated with a communication appliance, such as a personal computer or a workstation, for example. The mail transfer agent 10 includes a penalty count filter module (PCFM) 20 integrated into a front end 15 of the mail transfer agent 10, an incoming message queue 13, and a forwarding daemon 18. In a preferred embodiment, the front end 15 functions in accordance with Simple Mail Transfer Protocol (SMTP) as is well known in the relevant art.

The incoming e-mail message 11 is provided to an accept/reject filter 23 which determines whether to save the incoming e-mail message 11 to the incoming message queue 13 as an accepted e-mail message 16, or reject the incoming e-mail message 11 and transmit a transient negative completion reply 19 to the originator of the message. The accept/reject determination is made by the accept/reject filter 23 on the basis of a sender penalty count status 27 and a PCFM state 29. As explained in greater detail below, a sender identifier 21 is obtained from the incoming e-mail message 11 and is used to determine the sender penalty count status 27.

The sender may be identified by using a reverse Domain Name Service (DNS) verification to ascertain the IP address of the originator of the incoming e-mail message 11. Under circumstances in which the envelope address of the sender is not available, such as during a TCP timeout attack, the peer IP address of the TCP connection can be used as the sender identifier 21. The sender penalty count status module 27 maintains a constantly-updated list of senders associated with undesirable e-mail activity. Such undesirable activity may include, for example, sending large numbers of e-mails, sending e-mails of relatively large sizes, using too much TCP connection time, or causing a TCP timeout.

The system resource usage status 25, which is updated whenever a TCP connection is established, is used to determine the PCFM state 29, as described in greater detail below. The system resource usage status 25 provides a value for the usage or capacity status of one or more system resources related to the processing of incoming messages, including the incoming e-mail message 11, such as disk space occupied by the incoming message queue 13, the number of e-mail files in the incoming message queue 13, or the number of concurrent TCP connections being maintained.

Figure 2:
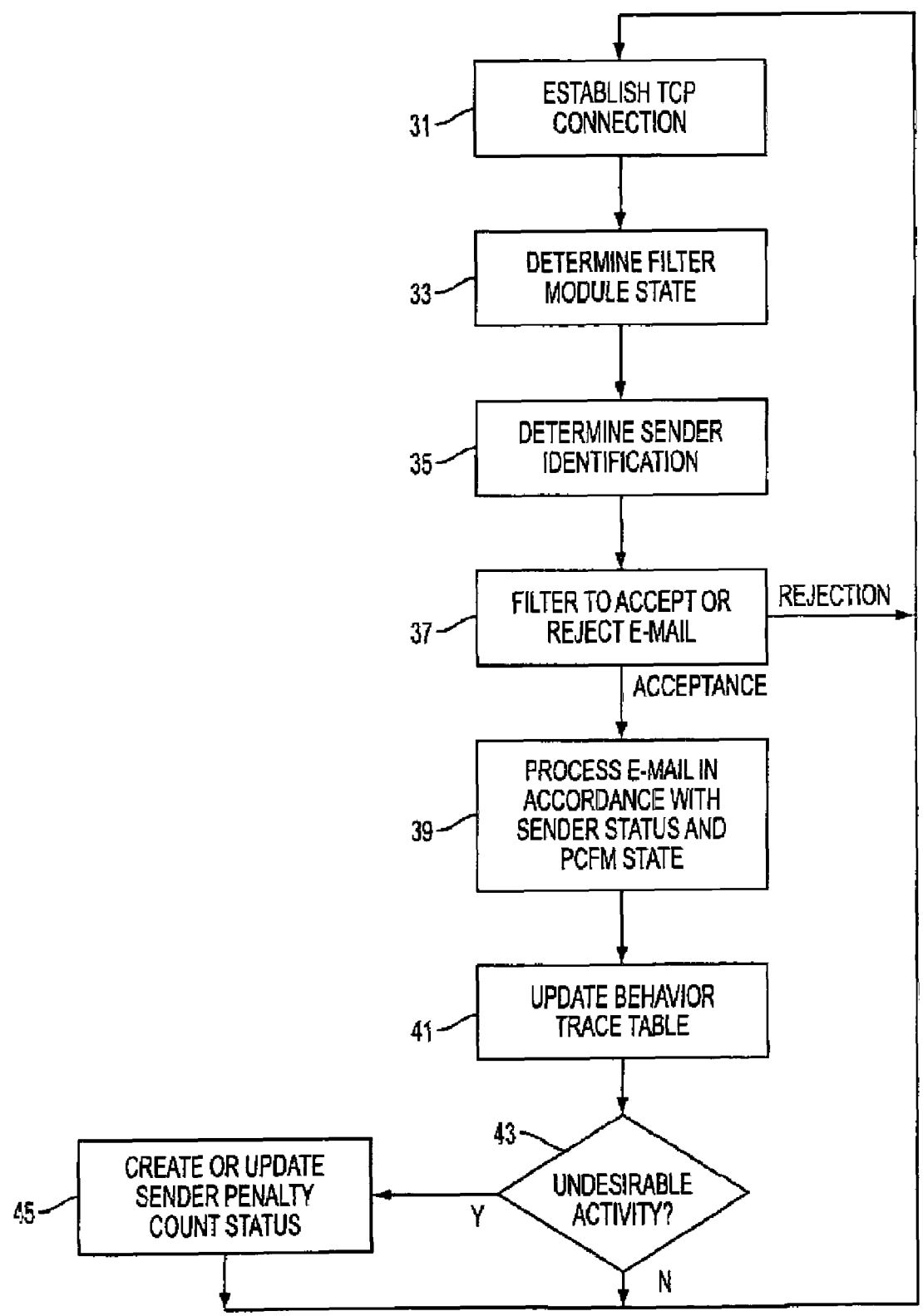
FIG. 2 is a flow diagram describing the sequence of operations performed by the penalty count filter module of FIG. 1.

Operation of the mail transfer agent 10 can be described with additional reference to the flow diagram of FIG. 2, in which the mail transfer agent 10 completes a TCP connection, at step 31, and receives the incoming e-mail message 11. The PCFM state 29 is determined, at step 33, and the identity of the sender of the e-mail message 11 is determined, at step 35. The PCFM state 29 is determined as a function of: i) the current PCFM state, ii) the time period for which the penalty count filter module 20 has remained in the current PCFM state, and iii) the current system resource usage status 25. Determination of the PCFM state 29 is not dependent on the identity of the sender of the e-mail message 11.

Using a process described in greater detail below, the accept/reject filter 23 determines, at step 37, either that the incoming e-mail message 11 is to be transmitted to the addressee as a forwarded e-mail message 17, or that the incoming e-mail message 11 is to be rejected and an optional transient negative completion reply 19 is to be transmitted to the sender, stating that the incoming e-mail message 11 has been rejected. The determination of accepting or rejecting the e-mail message 11 is made based on the current PCFM state 29 and the identity of the sender of the e-mail message 11. When the current incoming e-mail message 11 has been processed, the mail transfer agent 10 updates a behavior trace table 160 (shown in FIG. 7, below), at step 41. In a preferred embodiment, the activity of each e-mail sender is tracked and updated by means of the behavior trace table 160. It should be understood that not all e-mail senders listed in the behavior trace table 160 will subsequently produce sufficient undesirable behavior to acquire a penalty count status.

The sender penalty count status module 27 determines if the incoming e-mail message 11 exhibits undesirable activity, at decision block 43, and if so, the sender penalty count status module 27 creates a new listing for the sender identifier 21 in a penalty count table 50 (shown in FIG. 3) with an appropriate sender penalty count value, at step 45. Or, if a listing already exists for the sender identifier 21, the corresponding sender penalty count value is updated. For normal e-mail activity in which no undesirable activity is detected, no change is made to the sender entry in the penalty count table 50. For a sender not listed in the penalty count table 50, the penalty count value is taken to be zero. In one embodiment of the present method, the activity of the sender of the e-mail message 11 is monitored after the TCP connection, established at step 31, has been terminated. Undesirable activity related to the current e-mail message 11 is noted, and the appropriate penalty count assessed. Operation of the mail transfer agent 10 then proceeds to step 31, at which the next TCP connection is established.

Derivation of Penalty Count Status

Figure 3:
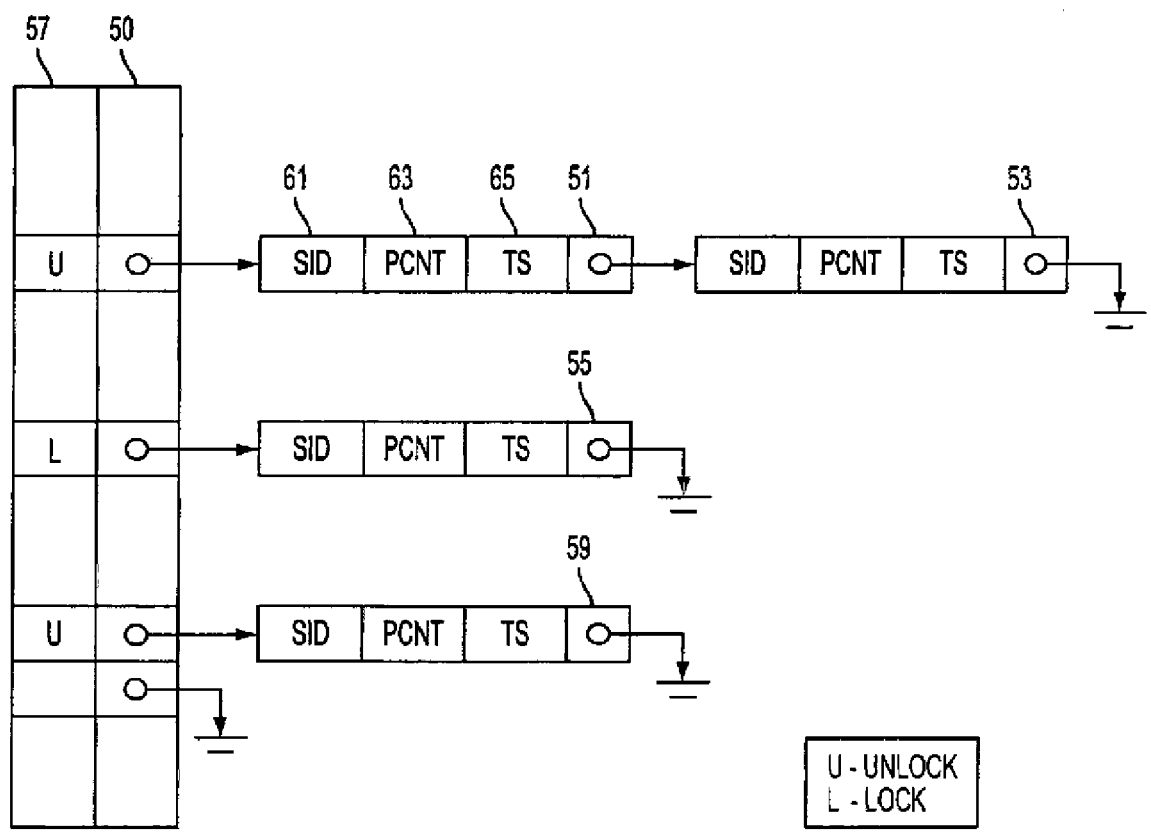
FIG. 3 is a data structure diagram of a penalty count table resident in the penalty count filter module of FIG. 1.

The function of the penalty count table 50 can be described with reference to the data structure diagram in FIG. 3. The penalty count table 50 includes a plurality of records, represented by records 51, 53, 55, and 59. A semaphore feature 57, or a similar lock/unlock facility, is associated with each table entry for the purpose of synchronization when, for example, two or more processors are used to process the incoming e-mail message 11. The structure of the records 53, 55, and 59 are similar to that of the record 51 which includes a sender identifier (SID) value 61, a cumulative penalty count (PNCT) value 63, and a timestamp (TS) value 65.

In a preferred embodiment, the process of looking up sender identifier values can be optimized by using keys computed from the SIDs to hash the penalty count table 50. In a table with 256 entries, for example, the least significant byte of a corresponding sender identifier value can be used as the hash key. Rehashing can be minimized by a configuration in which each entry of the hash table points to a linked list, where the records are stored in the link list.

The cumulative penalty count value 63 is a time-dependent parameter which is updated in accordance with the behavior of the sender identified by the corresponding SID value 61. The timestamp value 65 records the time $T_{TS}$ at which the cumulative penalty count value 63 was most recently calculated. The timestamp value 65 also provides for determining when the record 51 becomes out-of-date and should be removed from the penalty count table 50. In a preferred embodiment, the record 51 is removed after a retention period $\tau_{PCNT}$ of approximately $2^{19}$ seconds (i.e., about six days). The cumulative penalty count (PCNT) value 63 is preferably derived using the equation, $$PCNT = \min(\kappa, \alpha + \phi) \qquad (1$$

where $\kappa$ is a pre-established maximum value for PCNT, $\alpha$ is an activity penalty count charged to the sender for the current undesirable activity, and $\phi$ is a previous penalty count value which was determined from the recent past history, if any, of undesirable activity produced by the sender. In a preferred embodiment, $\kappa$ is set to 128.

The value for the activity penalty count $\alpha$ can be an integer specified by the system administrator, and may have a different value for different types of undesirable activities. For example, an activity penalty count of six may be assessed for sending a large number of e-mails exceeding a pre-established maximum quantity, an activity penalty count of four may be assessed for sending one or more e-mails exceeding a pre-established cumulative file size, and another activity penalty count may be assessed for incurring a TCP connection time exceeding a predetermined threshold. The activity penalty count is additive such that a sender can be assessed an activity penalty count of ten for exceeding both the maximum quantity and file size, for example.

The process of deriving the cumulative penalty count value 63 begins with the occurrence of an initial undesirable activity, for which a first activity penalty count of $\alpha_1$ is charged to the sender identified by the SID value 61. As described above, the timestamp value 65 records the time (denoted as $T_1$ in the following example) of the occurrence of the current (i.e., the first) undesirable activity. Accordingly, $$PCNT(T_1) = \min(\kappa, \alpha_1) = \alpha_1, \qquad (2$$

since $\phi = 0$ where there has occurred only the first undesirable activity.

If the sender identified by the SID value 61 produces a subsequent (i.e., the second) undesirable activity at a time $T_2$, a second activity penalty count $\alpha_2$ is assigned. If $T_2$ lies within the retention period $\tau_{PCNT}$, the previous cumulative penalty count (PCNT) 63 is updated to the value $PCNT(T_2)$ using the expression, $$PCNT(T_2) = \min(\kappa, \alpha_2 + \varphi_2), \quad (3)$$

where, $$\varphi_2 = \left[ PCNT(T_1) \cdot \left(1 - \frac{T_2 - T_1}{\tau_{PCNT}}\right) \right], \quad (4)$$

to give, $$PCNT(T_2) = \alpha_2 + \alpha_1\left(1 - \frac{T_2 - T_1}{\tau_{PCNT}}\right). \quad (5)$$

Note that, if $T_2$ occurs after the retention period $\tau_{PCNT}$ following $T_1$, then $\phi_2=0$.

In general, the $n^{th}$ cumulative penalty count 63, updated at time $T_n$ can be determined using the expression, $$PCNT(T_n) = \min(\kappa, \alpha_{n-1} + \varphi_n), \quad (6)$$

where, $$\varphi_n = \left[ PCNT(T_{n-1}) \cdot \left(1 - \frac{T_n - T_{n-1}}{\tau_{PCNT}}\right) \right]. \quad (7)$$

Determination of PCFM State

In a preferred embodiment, the penalty count filter module 20 operates in one of at least three states: a 'normal' state, a 'selective-rejection' state, and a 'random-rejection' state. When the penalty count filter module 20 is operating in the 'normal' state, the mail transfer agent 10 accepts all valid incoming e-mail message 11 from any senders for transmittal to the intended addressees. As the system resources required to handle incoming e-mail volume increase and a greater demand is placed on the mail transfer agent 10, operation of the penalty count filter module 20 will change from the 'normal' state to either the 'selective rejection' state or the 'random rejection' state. Subsequently, if the e-mail volume returns to normal levels, operation of the penalty count filter module 20 eventually reverts to 'normal.'

If initially in the 'normal' state, operation of the penalty count filter module 20 changes from the 'normal' state to the 'selective-rejection' state if the system resources have increased beyond a first pre-established, 'selective-rejection' watermark. The selective-rejection watermark is reached, for example, when the disk space of the incoming message queue exceeds a predetermined disk-space threshold, or when the number of concurrent TCP connections exceeds a predetermined connection number. In alternative embodiments, other such criteria can be used, as specified by the system administrator, to define additional watermarks and operational states.

If initially operating in the 'random-rejection' state, the penalty count filter module 20 will remain in the 'random-rejection' state for at least a period of time denoted as a time-to-stay ($T_{TS}$) interval $\tau_{TTS}$. After the time-to-stay interval $\tau_{TTS}$ has passed, the penalty count filter module 20 may revert to either 'selective-rejection' operation or 'normal' operation, depending on the system resource usage status file 25. Alternatively, if initially operating in the 'selective-rejection' state, the penalty count filter module 20 will continue in the 'selective-rejection' operation for the time-to-stay interval $\tau_{TTS}$ and then revert to the 'normal' state, except when e-mail volume increases and operation of the penalty count filter module 20 is changed to the 'random-rejection' state. In a preferred embodiment, the time-to-stay interval $\tau_{TTS}$ is approximately ten minutes.

Figure 4A:
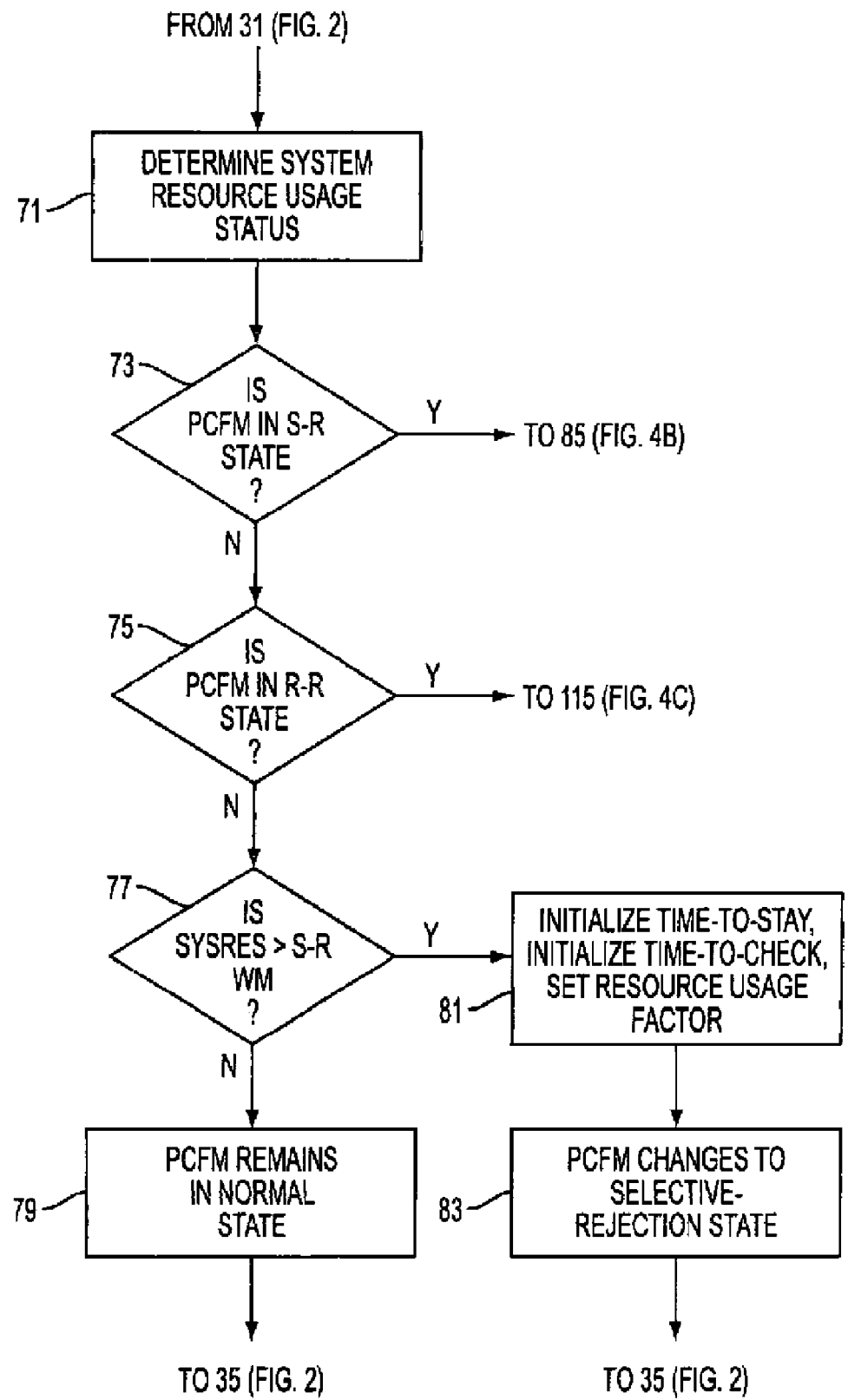
FIG. 4 is a flow diagram describing in greater detail the operation of the penalty count filter module, as represented by the step of determining filter module status in the flow diagram of FIG. 2.
Figure 4B:
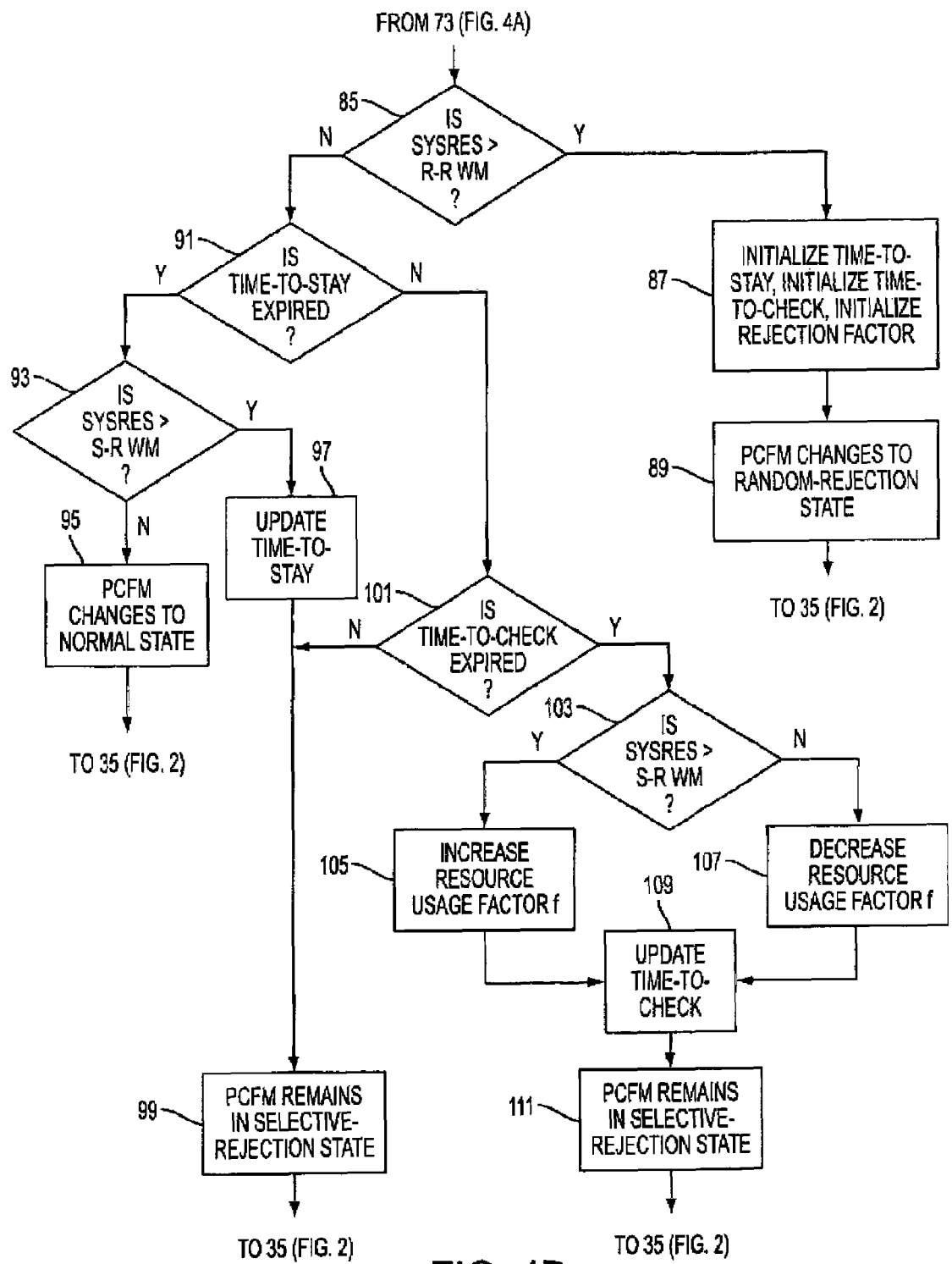
Figure 4C:
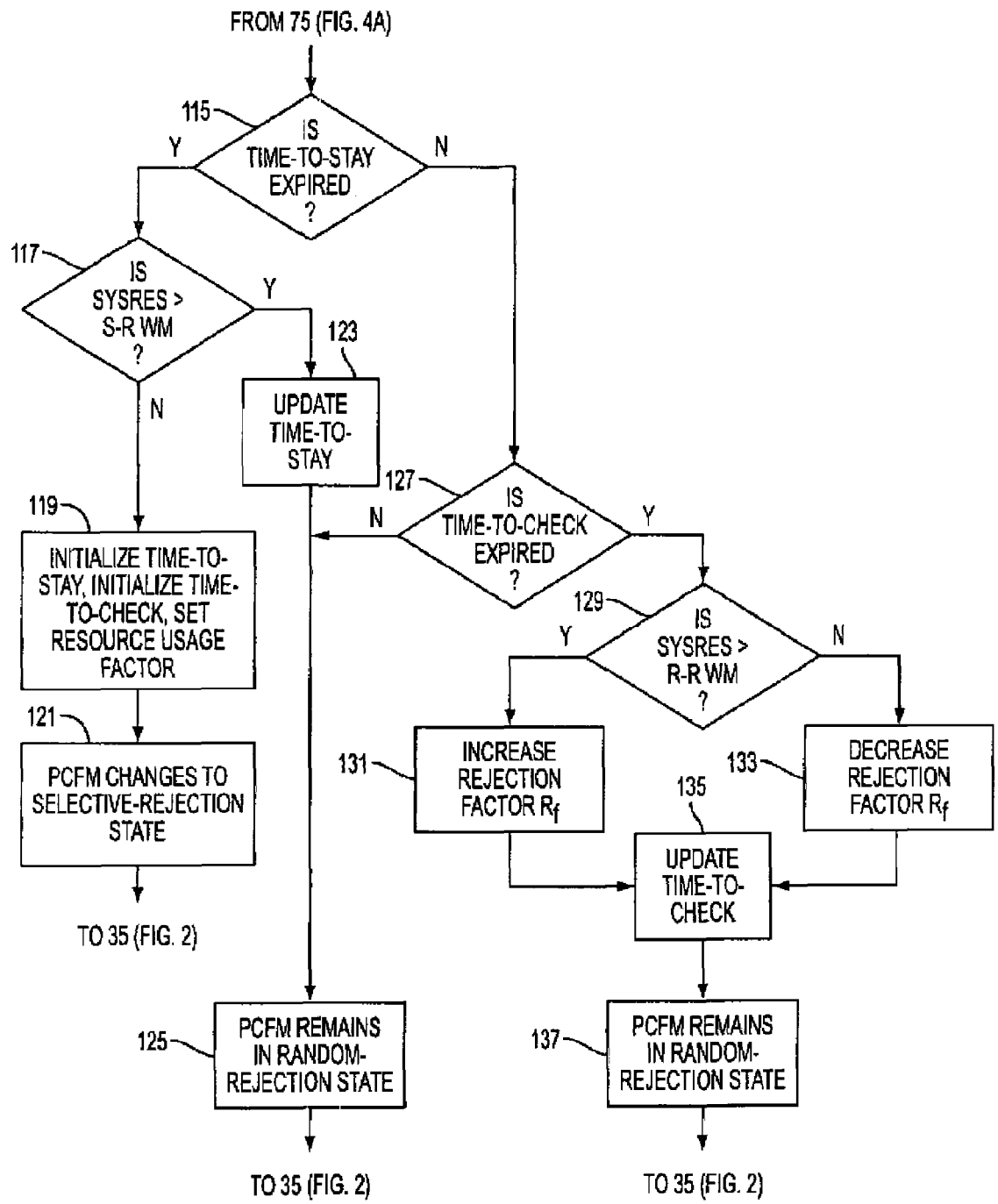

The application of the PCFM state 29 to the process of managing the incoming e-mail message 11 can be explained with reference to the flow diagram of FIG. 4, which provides a more detailed description of step 33 in FIG. 2. From step 31, the system resource usage status 25 is determined, at step 71. A query is made as to whether the penalty count filter module 20 is in the selective-rejection state, at decision block 73. If the response is 'yes,' operation proceeds to decision block 85. If the response is 'no' in decision block 73, a subsequent query is made as to whether the penalty count filter module 20 is in the random-rejection state, at decision block 75. If the response is 'yes,' operation proceeds to decision block 115. If the response is 'no' in decision block 75, a query is made as to whether the system resource (SYSRES) has exceeded the selective-rejection watermark, at decision block 77. If the selective-rejection watermark has been exceeded, the time-to-stay is initialized to the time-to-stay interval $\tau_{TTS}$, a resource usage factor f is set to an initial value, and the time-to-check is initialized to a time-to-check interval $\tau_{CHK}$, at step 81. In a preferred embodiment, the time-to-check interval $\tau_{CHK}$ is approximately three seconds. The penalty count filter module 20 then changes to the selective-rejection state, at step 83. If the selective-rejection watermark has not been exceeded, at decision block 77, the penalty count filter module 20 remains in the normal state, at step 79.

If the penalty count filter module 20 is determined to be in the selective-rejection state, at decision block 73 (above), operation proceeds to decision block 85 at which a query is made as to whether the system resource has exceeded the random-rejection watermark. If the random-rejection watermark has been exceeded, the time-to-stay is initialized to the time-to-stay interval $\tau_{TTS}$, a rejection factor $R_f$ is set to an initial value, and the time-to-check is initialized to a time-to-check interval $\tau_{CHK}$, at step 87. The rejection factor $R_f$ has a value assigned by the system administrator and may have an initial value of two, for example. The penalty count filter module 20 changes to the random-rejection state, at step 89, and operation proceeds to step 35.

If the random-rejection watermark has not been exceeded, at decision block 85, a query is made as to whether the time-to-stay has expired, at decision block 91. If the time-to-stay has expired, a query is made as to whether the system resource has exceeded the selective-rejection watermark, at decision block 93. If the selective-rejection watermark has not been exceeded, the penalty count filter module 20 changes to the normal state, at step 95, and operation proceeds to step 35. If the selective-rejection watermark has been exceeded, at decision block 93, the time-to-stay is updated, at step 97, the penalty count filter module 20 remains in the selective-rejection state, at step 99, and operation proceeds to step 35.

If the time-to-stay has not expired, at decision block 91, a query is made as to whether the time-to-check has expired, at decision block 101. If the time-to-check has not expired, the penalty count filter module 20 remains in the selective-rejection state, at step 99, and operation proceeds to step 35. If the time-to-check has expired, at decision block 101, a query is made as to whether the system resource has exceeded the selective-rejection watermark, at decision block 103. If the selective-rejection watermark has been exceeded, a resource usage factor f (defined below) is increased, at step 105, and the time-to-check is updated, at step 109. In one preferred embodiment, the resource usage factor f is doubled when the system resource exceeds the selective-rejection watermark. If the selective-rejection watermark has not been exceeded, at decision block 103, the resource usage factor f is decreased, at step 107, and the time-to-check is updated, at step 109. In another preferred embodiment, the resource usage factor f is decreased by a factor of two if the selective-rejection watermark has not been exceeded. After the time-to-check has been updated, at step 109, the penalty count filter module 20 remains in the selective-rejection state, at step 111, and operation proceeds to step 35.

If the penalty count filter module 20 is determined to be in the random-rejection state, at decision block 75 (above), operation proceeds to decision block 115 at which a query is made as to whether the time-to-stay has expired. If the time-to-stay has expired, a query is made as to whether the system resource has exceeded the random-rejection watermark, at decision block 117. If the random-rejection watermark has not been exceeded, the time-to-stay is initialized to the time-to-stay interval $\tau_{TTS}$, the resource usage factor f is set to an initial value, and the time-to-check is initialized to the time-to-check interval $\tau_{CHK}$, at step 119. Subsequently, the penalty count filter module 20 changes to the selective-rejection state, at step 121, and operation proceeds to step 35. If the random-rejection watermark has been exceeded, at decision block 117, the time-to-stay is updated, at step 123, the penalty count filter module 20 remains in the random-rejection state, at step 125, and operation proceeds to step 35.

If the time-to-stay has not expired, at decision block 115, a query is made as to whether the time-to-check has expired, at decision block 127. If the time-to-check has not expired, the penalty count filter module 20 remains in the random-rejection state, at step 125, and operation proceeds to step 35. If the time-to-check has expired, at decision block 127, a query is made as to whether the system resource has exceeded the random-rejection watermark, at decision block 129. If the random-rejection watermark has been exceeded, the rejection factor $R_f$ is increased, at step 131, and the time-to-check is updated, at step 135. In a preferred embodiment, the rejection factor $R_f$ is doubled when the system resource exceeds the random-rejection watermark. If the selective-rejection watermark has not been exceeded, at decision block 129, the rejection factor $R_f$ is decreased, at step 133, and the time-to-check is updated, at step 135. In one preferred embodiment, the rejection factor $R_f$ is decreased by a factor of two if the random-rejection watermark has not been exceeded. After the time-to-check has been updated, at step 135, the penalty count filter module 20 remains in the random-rejection state, at step 137, and operation proceeds to step 35.

Processing E-mail

Figure 5:
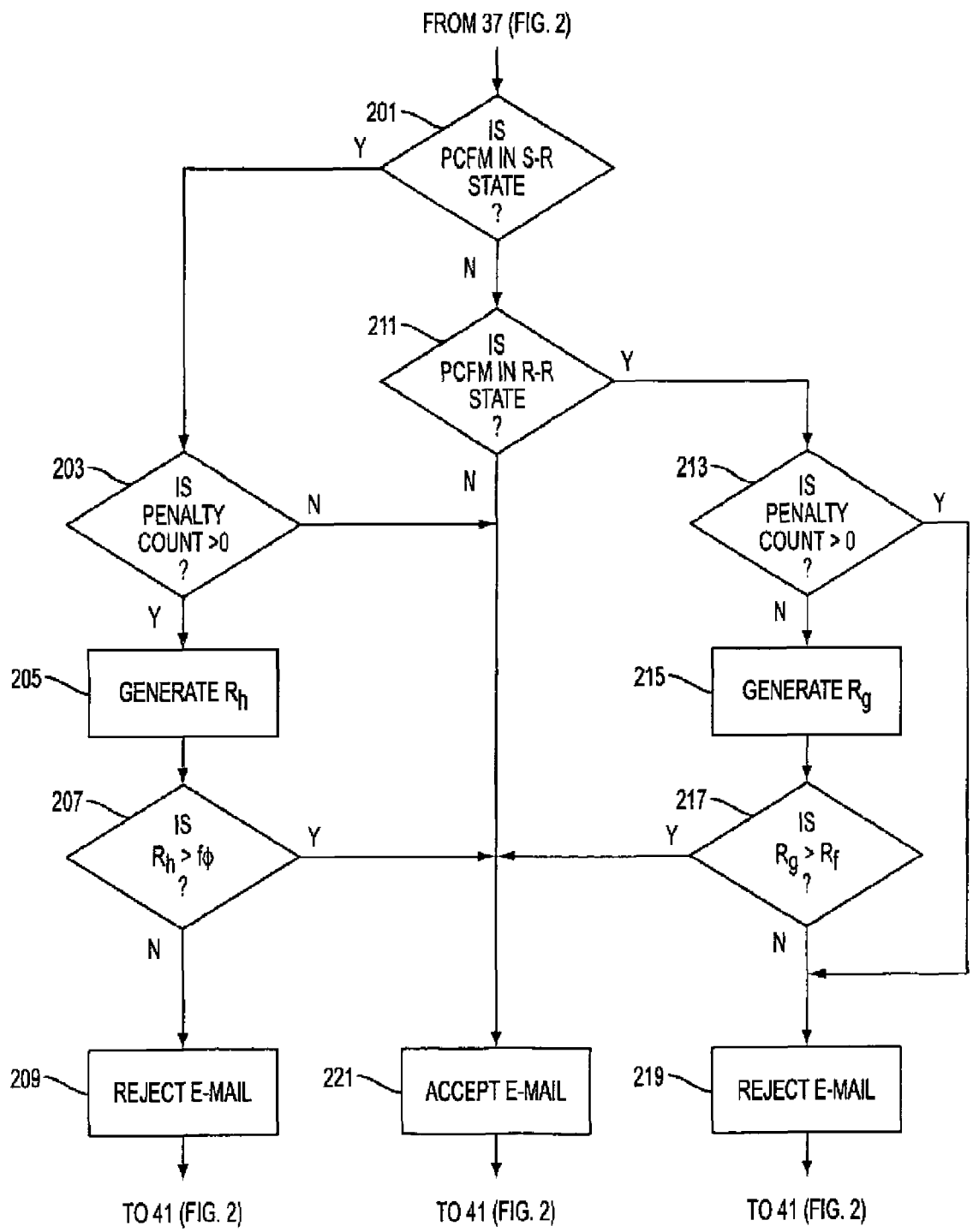
FIG. 5 is a flow diagram describing in greater detail the operation of the penalty count filter module, as represented by the step of processing e-mail in accordance with sender and filter module status in the flow diagram of FIG. 2.

The operation of processing e-mail in accordance with sender status and the penalty count filter module state, at step 39 of FIG. 2, is shown in greater detail in the flow diagram of FIG. 5, in which a query is made, at decision block 201, as to whether the penalty count filter module 20 is in the selective-rejection state. If the response is 'yes,' a query is made as to whether the current value of the cumulative penalty count φ is greater than zero, at decision block 203. If the response is 'no,' the incoming e-mail message 11 is accepted, at step 171, and sent to the addressee as forwarded e-mail 17. If the response is 'yes,' in decision block 203, a random number $R_h$ is generated, at step 205, where $1 \leq R_h \leq \kappa$.

A query is then made, at decision block 207, as to whether the random number $R_h$ is greater than the product of the resource usage factor f and the current value of the cumulative penalty count φ. If the response is 'yes,' the incoming e-mail message 11 is accepted, at step 171, and forwarded to the addressee. Operation returns to step 41 where the behavior trace table 160 is updated. If the response is 'no,' at decision block 207, the incoming e-mail message 11 is rejected, at step 209, the penalty count filter module 20 returns the transient negative completion reply 19 to the sender, and operation returns to step 41.

If the response is 'no,' at decision block 201, a query is made as to whether the penalty count filter module 20 is in the random-rejection state, at decision block 211. If the response is 'no,' the incoming e-mail message 11 is accepted, at step 171, and sent to the addressee as forwarded e-mail 17. If the response is 'yes,' at decision block 211, a query is made as to whether the current value of the cumulative penalty count φ is greater than zero, at decision block 213. If the response is 'yes,' at decision block 213, the incoming e-mail message 11 is rejected, at step 219, and the penalty count filter module 20 returns the transient negative completion reply 19 to the sender. If the response is 'no,' at decision block 213, a random number $R_g$ is generated, at step 215, where $1 \leq R_g \leq \kappa$.

A query is made, at decision block 217, as to whether the random number $R_g$ is greater than the rejection factor $R_f$. If the response is 'yes,' the incoming e-mail message 11 is accepted, at step 171, and forwarded to the addressee. If the response is 'no,' at decision block 217, the incoming e-mail message 11 is rejected, at step 219, the penalty count filter module 20 returns the transient negative completion reply 19 to the sender, and operation returns to step 41 where the behavior trace table 160 is updated.

As described above, the resource usage factor f is used at step 207 to determine whether a particular incoming e-mail message 11 is to be randomly returned to the sender or transmitted to the intended addressee. The resource usage factor f is derived from the average cumulative penalty count $\overline{P}$, where $$\overline{P} = \frac{\sum_{i=1}^{m} PCNT_i}{m}, \tag{8}$$

and where $PCNT_i$ is the penalty count assessed to the $i^{th}$ sender identifier, of the m sender identifiers listed in the penalty count table 50. The resource usage factor f is given by the equation, $$f = \frac{\kappa}{2\overline{P}}. \tag{9}$$

As described above, the penalty count filter module 20 then generates the random number $R_h$, which is compared to the product of the resource usage factor f and the current value of the cumulative penalty count φ. If $R_h > f \cdot \phi$, the incoming e-mail message 11 is accepted by the penalty count filter module 20; if $R_h \leq f \cdot \phi$, the incoming e-mail message 111 is rejected and the penalty count filter module 20 issues the transient negative completion reply 19 to the corresponding sender.

Behavior Trace Table

Figure 6:
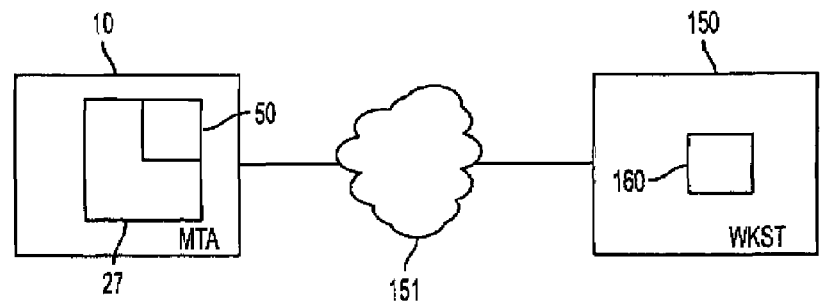
FIG. 6 is a diagrammatical illustration of a communications network including the penalty count rejection table of FIG. 3 resident in a mail transfer agent and a behavior trace table resident in a workstation.

In a preferred embodiment, the behavior trace table 160 is included in a workstation 150 which is connected with the mail transfer agent 10 by means of a communication network 151, such as a LAN or WAN, as shown in FIG. 6. Information included in the behavior trace table 160, which tabulates e-mail activities of the sender, is used by the sender penalty count status 27 to update the cumulative penalty count φ of an e-mail sender in the penalty count table 50.

Figure 7:
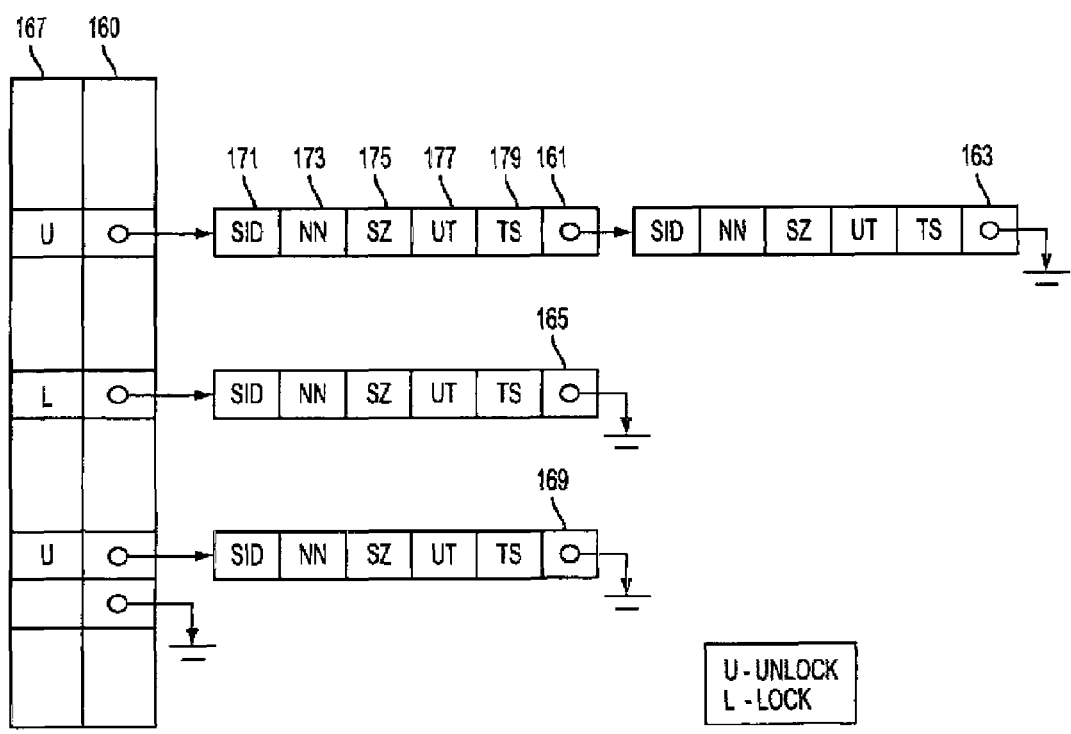
FIG. 7 is a data structure diagram of the behavior trace table of FIG. 6.

The behavior trace table 160 includes a plurality of records, or behavior values, represented by records 161, 163, 165 and 169, shown in FIG. 7. A semaphore feature 167, or a similar lock/unlock facility, is associated with each table entry. The structure of the records 163, 165, and 169 are similar to that of the record 161 which includes a sender identifier (SID) value 171, a cumulative e-mail count (NN) 173 of the sender e-mails, a total e-mail size (SZ) 175 of the e-mail files, a total TCP connection utilization time (UT) 177, and a timestamp (TS) value 179 which is a record of the most recent e-mail received from the sender identified by the SID value 171.

The process of looking up sender identifier values can be optimized by using keys computed from the SIDs to hash the behavior trace table 160, using a method similar to that for looking up values in the penalty count table 50. Rehashing can be minimized in the behavior trace table 160 by having each entry of the hash table point to a linked list, where the records are stored in the link list. Each record 161, 163, 167, and 169 in the behavior trace table 160 has a retention period of $\tau_{BHT}$, after which the out-of-date record is removed when the corresponding table entry is visited and the record is traversed. In a preferred embodiment, the retention period $\tau_{BHT}$ is approximately five seconds.

When the incoming e-mail message 11 corresponds to the sender identified by the sender identifier value 171, the cumulative e-mail count 173, the cumulative total size 175, and the cumulative total TCP connection utilization time 177 are updated using current and previous values, and where the previous values are reduced by a decay factor d. The updated cumulative e-mail value (NN) is given by the equation, $$NN = 1 + d \cdot NN(T_{TS}), \quad (10)$$

where $NN(T_{TS})$ is the prior or most recent previous e-mail count value, previously obtained at the timestamp time ($T_{TS}$).

The updated cumulative total size (SZ) is given by the equation, $$SZ = SZ(T_{UD}) + d \cdot SZ(T_{TS}), \quad (11)$$

where $SZ(T_{UD})$ is the additional e-mail size obtained at the time of updating the record and $SZ(T_{TS})$ is the prior or most recent previous e-mail size. Similarly, the updated cumulative connection utilization time (UT) is given by the equation, $$UT = UT(T_{UD}) + d \cdot UT(T_{TS}), \quad (12)$$

where $UT(T_{UD})$ is the connection utilization time determined at the time of updating the record and $UT(T_{TS})$ is the prior or most recent previous connection utilization time. After the cumulative e-mail count 173, the cumulative total size 175, and the cumulative total TCP connection utilization time 177 have been updated, the timestamp ($T_{TS}$) is reset to the most recent time of update. The decay factor d in equations 10 to 12 is given by, $$d = 1 - \min\left(1, \frac{T_{TC} - T_{TS}}{\tau_{BHT}}\right). \quad (13)$$

If any of the cumulative e-mail count 173, the cumulative total size 175, or the cumulative total TCP connection utilization time 177 exceeds a predefined threshold or watermark, as discussed above, the sender corresponding to the sender identifier value 171 is assessed an appropriate penalty count. For incoming e-mail message 11 sent by a sender not currently listed in the behavior trace table 160, a new entry is created with initial values of one, $SZ(T_{TS})$, and $UT(T_{TS})$ entered into the behavior trace table 160 for the cumulative e-mail count 173, the cumulative total size 175, and the cumulative total TCP connection utilization time 177, respectively.

Figure 8:
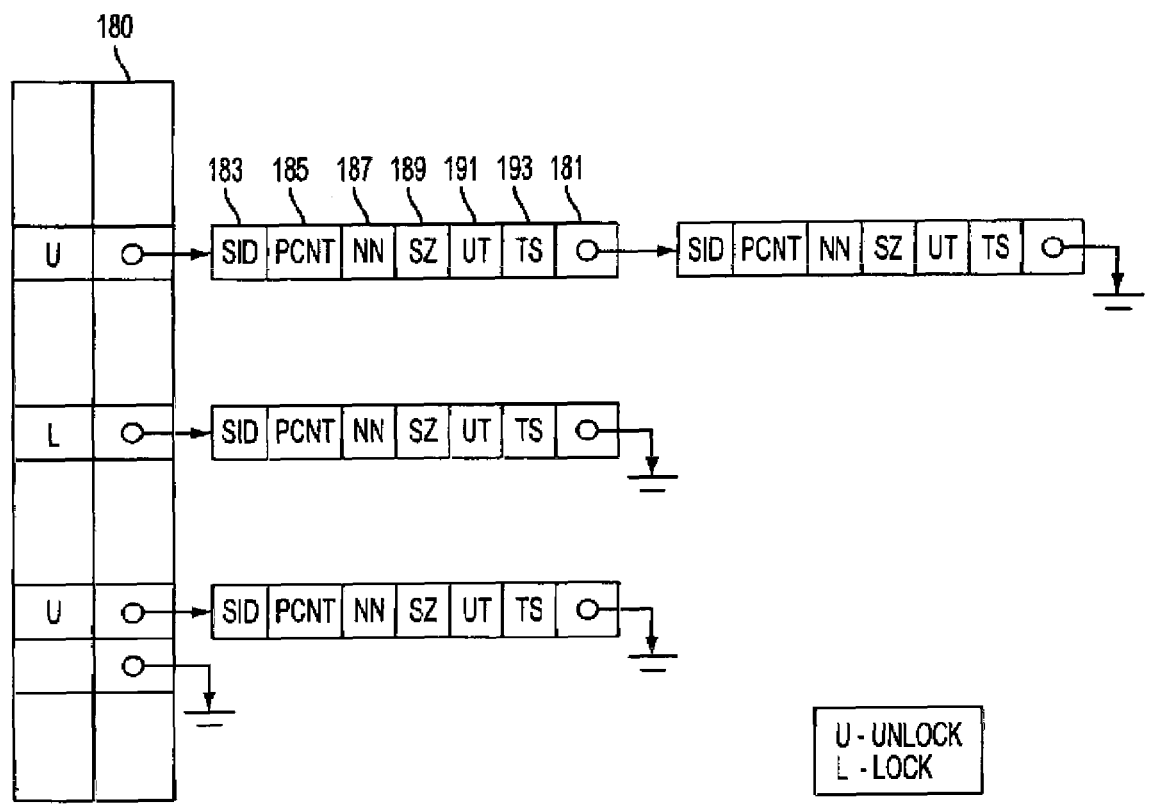
FIG. 8 is a data structure diagram of a merged penalty count table which includes data from the penalty count table of FIG. 3 and the behavior trace table of FIG. 7.

In yet another embodiment, the mail transfer agent 10 includes a merged penalty count table 180, shown in FIG. 8, which includes a plurality of records having entries similar to that shown for a record 181. The record 181 results from merging the data in the record 51 and the record 161, and includes a sender identifier (SID) value 183, a cumulative penalty count (PCNT) value 185, a cumulative e-mail count (NN) 187 of the sender e-mails, a total e-mail size (SZ) 189 of the e-mail files, a total TCP connection utilization time (UT) 191, and a timestamp (TS) value 193. As can be appreciated by one skilled in the relevant art, a behavior trace table 160 is not required in the workstation 150 if the mail transfer agent 10 includes the merged penalty count table 180 in place of the penalty count table 50.

Figure 9:
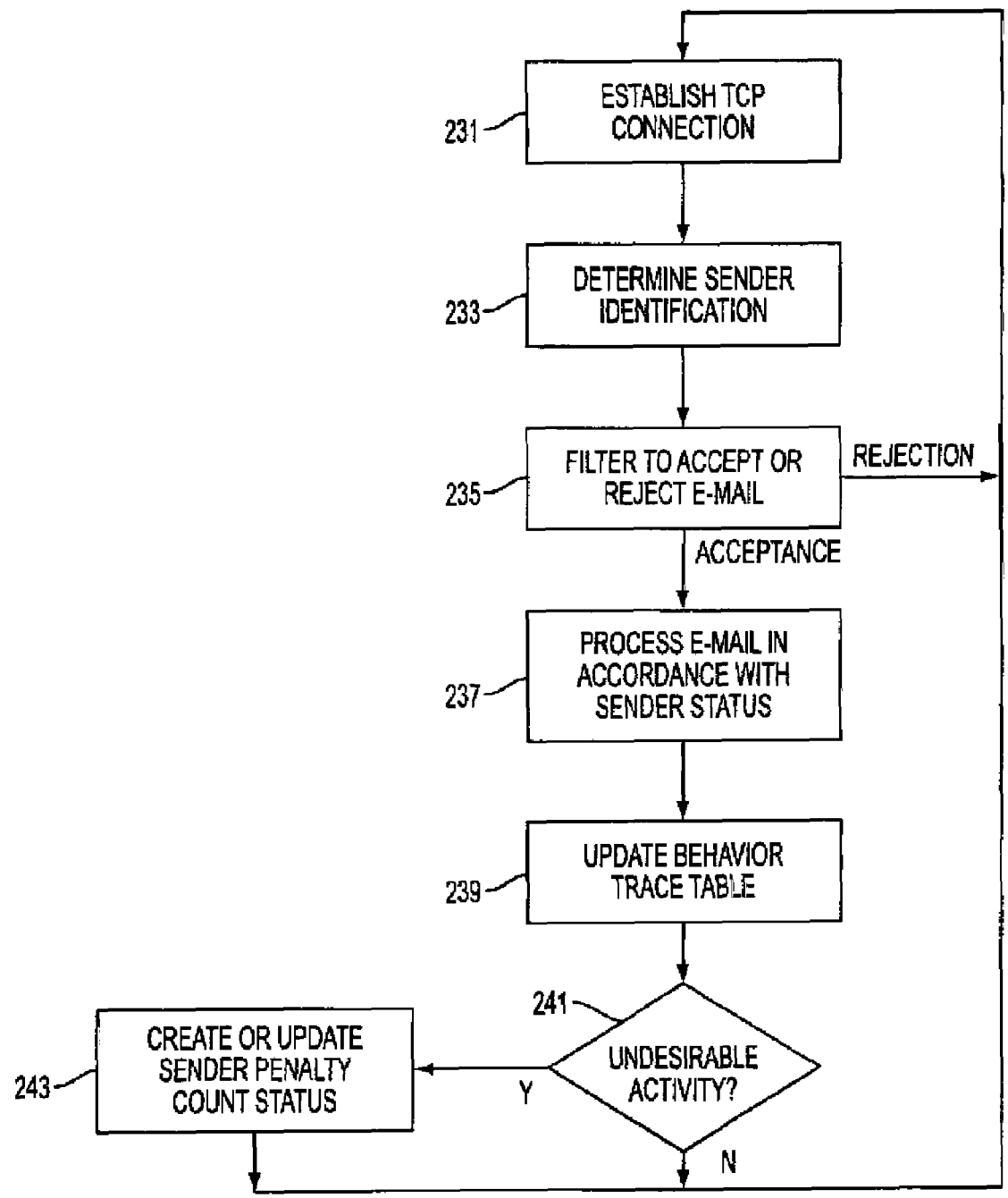
FIG. 9 is a flow diagram describing an alternative sequence of operations performed by the penalty count filter module of FIG. 1.

In an alternative embodiment, shown in the flow diagram of FIG. 9, the incoming e-mail 11 is processed in accordance with sender status. The mail transfer agent 10 completes a TCP connection, at step 231, and receives the incoming e-mail message 11. The identity of the sender of the e-mail message 11 is determined, at step 233. The accept/reject filter 23 determines, at step 235, either that the incoming e-mail message 11 is to be transmitted to the addressee or that the incoming e-mail message 11 is to be rejected. The determination of accepting or rejecting the e-mail message 11 is made based on the identity of the sender. When the current incoming e-mail message 11 has been processed, the behavior trace table 160 is updated, at step 239, and the sender penalty count status module 27 determines if the incoming e-mail message 11 exhibits undesirable activity, at decision block 241. If so, the sender penalty count status module 27 creates a new listing for the sender identifier 21 in the penalty count table 50 with an appropriate sender penalty count value, at step 243. Or, if a listing already exists for the sender identifier 21, the corresponding sender penalty count value is updated. For normal e-mail activity in which no undesirable activity is detected, no change is made to the sender entry in the penalty count table 50. For a sender not listed in the penalty count table 50, the penalty count value is taken to be zero. Operation of the mail transfer agent 10 then proceeds to step 231, at which the next TCP connection is established.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method comprising:
   determining an identity of a sender of an incoming e-mail;
   determining a cumulative penalty count value associated with said identity, wherein determining said cumulative penalty count value comprises assessing a penalty count value to said identity for an undesirable activity performed by the sender;
   retrieving a system overall resource usage status associated with a communication device processing the incoming e-mail; and
   processing the incoming e-mail on the basis of said cumulative penalty count value and said system overall resource usage status.

2. The method of claim 1 wherein determining the identity comprises associating the sender with a peer IP address of a TCP connection associated with the sender.

3. The method of claim 1 wherein said cumulative penalty count value comprises an activity penalty count charged to the sender for current undesirable sender activity and a time-dependent penalty count determined from previous undesirable sender activity.

4. The method of claim 3 wherein said time-dependent penalty count comprises a zero value subsequent to a pre-established retention period.

5. The method of claim 3 wherein said time-dependent penalty count comprises a prior activity penalty count value reduced by a time-dependent decay factor.

6. The method of claim 1 wherein said undesirable activity comprises a member of the group consisting of: sending a large number of e-mails, sending emails of relatively large sizes, using a relatively large amount of TCP connection time, and causing a TCP timeout.

7. The method of claim 1 wherein said system overall resource usage status is a function of a member of the group consisting of: a number of concurrent TCP connections being maintained, a number of e-mail files in an incoming message queue, and an amount of disk space being utilized for an incoming message queue.

8. The method of claim 1 wherein said processing the incoming e-mail comprises assigning an operating state to the communication device, said operating state being a function of said system overall resource usage status.

9. The method of claim 8 wherein said operating state is a selective-rejection state, and if said cumulative penalty count value has a zero value, said processing the incoming e-mail comprises accepting the incoming e-mail.

10. The method of claim 9 wherein if said cumulative penalty count value has a nonzero value, said processing the incoming e-mail comprises:
   specifying a rejection factor;
   generating a random number; and
   randomly rejecting the incoming e-mail on the basis of said rejection factor and said random number.

11. The method of claim 8 wherein, wherein said operating state is a random-rejection state, and if said cumulative penalty count value has a zero value, said processing the incoming e-mail comprises:
   deriving an overall resource usage factor;
   generating a random number; and
   randomly rejecting the incoming e-mail on the basis of said overall resource usage factor, said random number, and said cumulative penalty count value.

12. A device comprising:
   a processor; and
   memory storing machine readable instructions comprising a penalty count filter module that, when executed by the processor, configure the device to perform:
   identifying a sender of an incoming e-mail;
   assigning a penalty count to the sender, said penalty count being a function of previous undesirable activity associated with the sender;
   determining an overall resource usage value for said device in receiving e-mail;
   specifying an operating state for the penalty count filter module, said operating state being a function of said overall resource usage value; and
   disposing of the incoming e-mail on the basis of said sender penalty count and said operating state, by either accepting or rejecting the e-mail.

13. The device of claim 12 wherein identifying the sender comprises obtaining at least one of a Domain Name Service verification and a peer IP address of the sender TCP connection.

14. The device of claim 12 wherein said undesirable activity comprises a member of the group consisting of: sending a large number of e-mails, sending e-mails of relatively large sizes, using a relatively large amount of TCP connection time, and causing a TCP timeout.

15. The device of claim 12 wherein said overall resource usage value is a function of a member of the group consisting of: a number of concurrent TCP connections being maintained, a number of e-mail files in an incoming message queue, and an amount of disk space being utilized for an incoming message queue.

16. A device comprising:
   a sender penalty count data structure, stored in a memory of the device, configured to store a current penalty count value associated with a sender of an incoming email, wherein said current penalty count value is based at least in part on previous undesirable activity performed by the sender;
   a system resource usage status file, stored in the memory, configured to store a current usage status value for device e-mail processing resources; and
   an accept/reject filter, stored in the memory, configured to dispose of the incoming e-mail on the basis of said penalty count value and said usage status value.

17. The device of claim 16 wherein said sender penalty count data structure includes an entry comprising a member of the group consisting of: a sender identification value, a cumulative penalty count value, a cumulative e-mail count, a total e-mail size, a total TCP connection time, and a timestamp value.

18. A method comprising:
   identifying an e-mail sender of an incoming e-mail by determining a sender IP address;
   obtaining a previous sender penalty count value calculated for said sender IP address, wherein said previous sender penalty count value is based at least in part on previous undesirable activity performed by the sender; and
   accepting or rejecting the incoming e-mail based on said previous sender penalty count value.

19. The method of claim 18 further comprising:
   maintaining a behavior trace table entry for the e-mail sender; and
   determining said previous sender penalty count value from said behavior trace table entry.

20. The method of claim 19 further comprising updating a sender behavior value in said trace table entry in response to receipt of a sender e-mail.

21. The method of claim 20 wherein said sender behavior value includes a member of the group consisting of: a number of e-mails, a total size of e-mails, and a total TCP connection time.

22. The method of claim 20 wherein updating the sender behavior value comprises:
   reducing said sender behavior value by a time-dependent decay factor; and
   adding a current behavior value to said corresponding reduced sender behavior value.

23. The method of claim 18 wherein said previous sender penalty count value is determined from undesirable sender activity occurring over a pre-established retention period.

24. The method of claim 23 wherein said undesirable activity comprises a member of the group consisting of: sending a large number of e-mails, sending e-mails of relatively large sizes, using a relatively large amount of TCP connection time, and causing a TCP timeout.

25. The method of claim 1, wherein the penalty count is calculated based only in part on data received with the incoming email.

26. The method of claim 1, wherein the penalty count is calculated based on information generated by a device receiving the incoming email.

27. The device of claim 12, wherein assigning the penalty count to the sender comprises calculating the penalty count based only in part on data received with the incoming email.

28. The device of claim 12, wherein assigning the penalty count to the sender comprises calculating the penalty count based on information generated by the device.

* * * * *